No. 800,689. PATENTED OCT. 3, 1905.
F. W. STEINKE.
FLEXIBLE JOINT FOR PIPES.
APPLICATION FILED APR. 17, 1905.
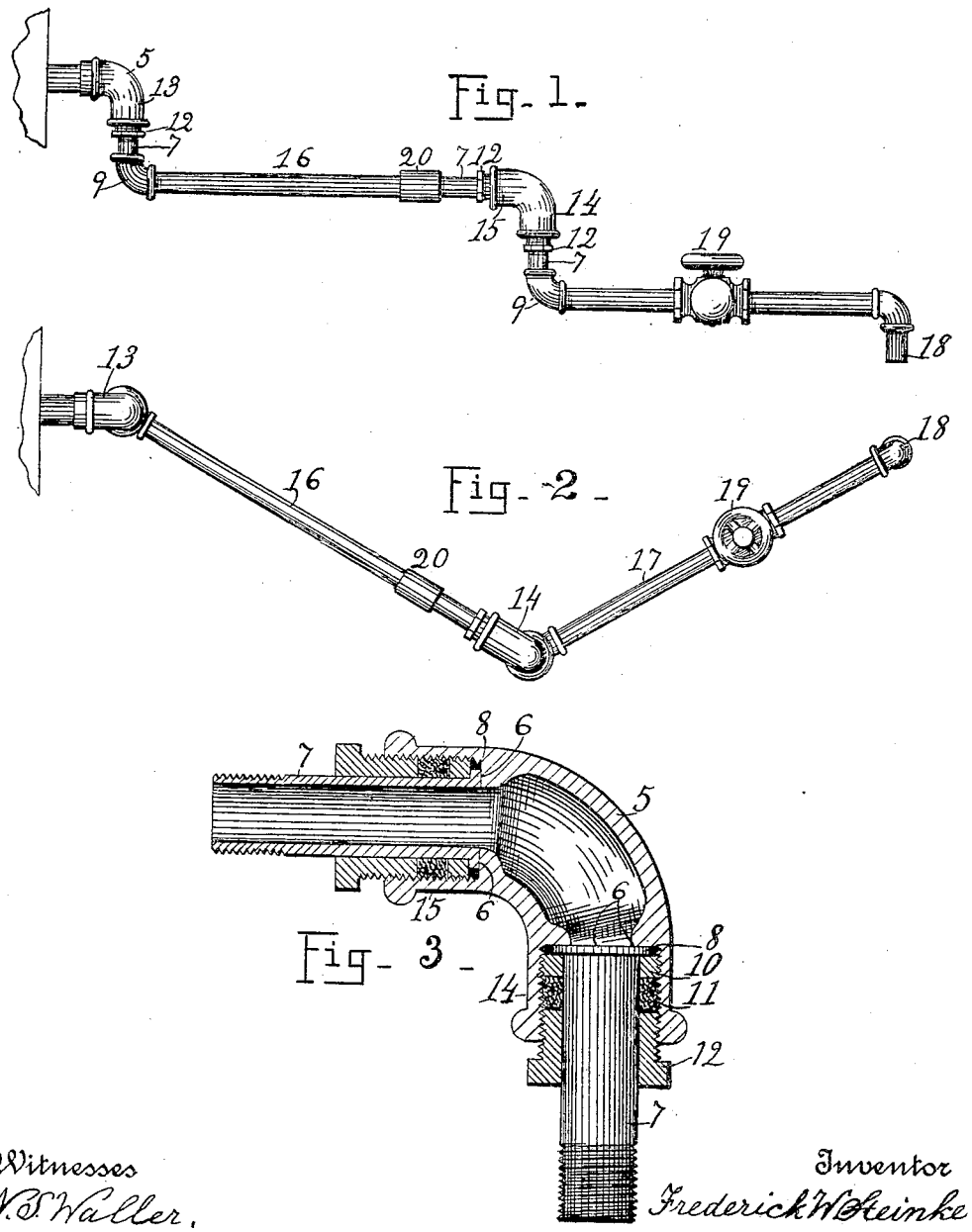

UNITED STATES PATENT OFFICE.

FREDERICK W. STEINKE, OF OWATONNA, MINNESOTA.

FLEXIBLE JOINT FOR PIPES.

No. 800,689. Specification of Letters Patent. Patented Oct. 3, 1905.

Application filed April 17, 1905. Serial No. 256,157.

*To all whom it may concern:*

Be it known that I, FREDERICK W. STEINKE, a citizen of the United States, residing at Owatonna, in the county of Steele and State of Minnesota, have invented certain new and useful Improvements in Flexible Joints for Pipes, of which the following is a specification.

This invention relates to flexible couplings for pipes. Its object is to provide means whereby the refuse skim-milk at creameries may be easily conducted from a tank to cans standing on a wagon in front thereof, which process requires that the nozzle of the delivery-pipe be moved from can to can. Heretofore hose-pipes have been tried; but it is almost impossible to keep such in a sanitary condition, and, furthermore, the milk running through them at nearly a boiling heat soon destroys the elasticity of the rubber of the pipes, so that they crack and leak. Metallic pipes have also been used with common screw-joints at the L's, and they do very well until the screw-threads become loose and leaky by frequent turning as the nozzle is swung from can to can.

This invention consists in the construction and combination of parts forming a flexible coupling for pipes, hereinafter more fully described, and particularly defined in the claims, reference being had to the accompanying drawings, in which—

Figure 1 shows a pipe in side elevation with three joints coupled according to my invention. Fig. 2 is a top or plan view of the same. Fig. 3 is a longitudinal sectional view of a pipe L, showing one of my couplings in each end thereof.

Numeral 5 represents a pipe L, which is the body of the coupling. This L is bored and screw-threaded in at each end to a true-faced shoulder 6.

7 is a pipe-nipple having a truly-finished flanged head 8 to fit with a rotary bearing against the shoulder 6 and screw-threaded at its outer end to enter and attach firmly to an L 9.

10 is a metallic ring threaded and screwed into the end of the body 5 against the outer face of the flange 8 and serving as a rotary bearing therefor.

11 represents soft packing material of any suitable kind.

12 is a packing-follower threaded to be screwed into the body 5 and bored to fit around the body of the nipple 7 and serve as a rotary bearing therefor.

The ring 10 may be slotted across its outer face or have holes bored therein to receive the prongs of a forked screw-driver to screw it to place with any degree of tightness or freedom desired, so as to form with the shoulder 6 a complete retaining-bearing for the flanged head 8. This retaining-ring 10 also serves as the inner shoulder, against which the soft packing 11 is pressed by the follower 12 so firmly as to be spread sidewise to fill the annular space between the body of the nipple 7 and the threaded inner face of the body 5 and pack the joint close enough to resist leakage from steam, water, or air pressure and yet leave the nipple free to rotate in the body as a flexible joint for pipes.

At 13 and 14 the joints have flexibility, so that the pipes below may swing in horizontal planes either way, and at 15 the joint has flexibility in a vertical plane at right angles to the axial line of the nipple 7 of that joint, whereby the nozzle 18 may be swung up or down to any point within the radial reach of the two pipes 16 and 17.

19 represents a hand-valve whereby the delivery through the pipe may be opened, closed, or checked.

20 represents a common pipe connection.

It is evident that the body 5 may be straight and connected as desired by means of common L's, like 9, and that any reasonable number of these flexible joints may be used to connect pipes of suitable lengths for various purposes.

This flexible joint for pipes is suited not only for delivering milk from a tank to a number of cans in a wagon, but it would serve, in connection with suitable couplings, for the air-brake pipes of a train of cars and for many other purposes where tight flexible joints are required in pipes.

Having thus fully described my invention, what I believe to be new, and desire to secure by Letters Patent, is the following:

1. In pipe-couplings, a body internally screw-threaded at its end, and having an inward-projecting true-faced shoulder; a pipe-nipple having a flanged head fitted for rotary bearing against the said shoulder, and adapted at its other end for connection with pipe; a ring fitted to be screwed into the said coupling-body around the body of the nipple and against the head thereof; packing material located around the nipple-body and against the said ring, and a follower screw-threaded into the coupling-body against the packing material.

2. In pipe-couplings, a body having an internal screw-thread and a shoulder beyond it; a pipe-nipple having a flanged head fitted to rotate against the said shoulder; a ring of rigid material screw-threaded into the said body and fitting against the flange and around the body of the nipple; compressible packing located around the nipple and filling the space between it and the body, and covering the joint between the nipple and the said ring, and between the ring and the body, and a follower for the packing, substantially as shown and described.

In testimony whereof I have affixed my signature in presence of two subscribing witnesses.

FREDERICK W. STEINKE.

Witnesses:
    E. W. RICHTER,
    PETER PRAHM.